United States Patent
Andrews

(10) Patent No.: US 10,309,703 B2
(45) Date of Patent: Jun. 4, 2019

(54) DC HEATING AND COOLING SYSTEMS AND METHODS

(71) Applicant: Tiger Tool International Incorporated, Abbotsford (CA)

(72) Inventor: Michael Andrews, Bellingham, WA (US)

(73) Assignee: TIGER TOOL INTERNATIONAL INCORPORATED, Abbotsford (CA)

(*) Notice: Subject to any disclaimer, the term of this patent is extended or adjusted under 35 U.S.C. 154(b) by 0 days.

(21) Appl. No.: 15/979,158

(22) Filed: May 14, 2018

(65) Prior Publication Data

US 2018/0266742 A1 Sep. 20, 2018

Related U.S. Application Data

(63) Continuation of application No. 15/047,442, filed on Feb. 18, 2016.

(60) Provisional application No. 62/117,824, filed on Feb. 18, 2015.

(51) Int. Cl.
*B60H 1/32* (2006.01)
*F25B 43/00* (2006.01)
*F25B 45/00* (2006.01)

(52) U.S. Cl.
CPC ......... *F25B 43/006* (2013.01); *B60H 1/3229* (2013.01); *F25B 45/00* (2013.01)

(58) Field of Classification Search
CPC .. F25B 43/006; F25B 5/02; F25B 2600/2511; F25B 27/00; F25B 2345/001; F25B 2400/03; F25B 45/00; B60H 2001/00121; B60H 1/00949; B60H 1/3282
See application file for complete search history.

(56) References Cited

U.S. PATENT DOCUMENTS

| | | | |
|---|---|---|---|
| 2004/0025525 A1* | 2/2004 | Kubo | B60H 1/00385 62/230 |
| 2005/0044864 A1* | 3/2005 | Manole | F25B 43/006 62/149 |
| 2006/0288713 A1* | 12/2006 | Knight | F24F 3/153 62/176.6 |

* cited by examiner

*Primary Examiner* — Cassey D Bauer
(74) *Attorney, Agent, or Firm* — Michael R. Schacht; Schacht Law Office, Inc.

(57) ABSTRACT

A HVAC system for a vehicle has a condenser, an evaporator, a compressor, a variable accumulator comprising a piston and an actuator, and a control system operatively connected to the actuator. Fluid flows in a circuit from the condenser, to the evaporator, to the compressor, and to the condenser. The variable accumulator is arranged between the evaporator and the compressor. The control system operates the actuator to displace the piston to alter at least one characteristic of the HVAC system.

8 Claims, 4 Drawing Sheets

DC HEATING AND COOLING SYSTEMS AND METHODS

RELATED APPLICATIONS

This application, U.S. patent application Ser. No. 15/979, 158 filed May 14, 2018 is a continuation of U.S. patent application Ser. No. 15/047,442 filed Feb. 18, 2016, now abandoned.

U.S. patent application Ser. No. 15/047,442 claims benefit of U.S. Provisional Application Ser. No. 62/117,824 filed Feb. 18, 2015.

The contents of all related applications are incorporated herein by reference.

TECHNICAL FIELD

The present invention relates to heating and cooling systems and methods that operate on DC power.

BACKGROUND

Utility power is typically made available as an AC power signal distributed from one or more centralized sources to end users over a power distribution network. However, utility power is unavailable for certain structures. For example, movable structures such vehicles do not have access to utility power when moving and can be connected to power distribution network when parked only with difficulty. Similarly, remote structures such as cabins and military installations not near the utility power distribution network often cannot be practically powered using utility power.

DC power systems including batteries are often employed to provide power when utility power is unavailable. For example, trucks and boats typically employ a DC power system including a battery array to provide power at least to secondary vehicle electronics systems such as communications systems, navigation systems, ignition systems, heating and cooling systems, and the like. Shipping containers and remote cabins that operate using alternative primary power sources such as solar panels or generators also may include DC power systems including a battery or array of batteries to operate electronics systems when primary power is unavailable. Accordingly, most modern vehicles and remote structures use battery power sufficient to operate, at least for a limited period of time, electronics systems such as secondary vehicle electronics systems.

The capacity of a battery system used by a vehicle or remote structure is typically limited by factors such as size, weight, and cost. For example, a vehicle with an internal combustion engine may include a relatively small battery for use when the engine is not operating; a large battery array is impractical for vehicles with an internal combustion engine because the size of the batteries takes up valuable space and the weight of the batteries reduces vehicle efficiency when the vehicle is being moved by the engine. All electric vehicles have significantly greater battery capacity, but that battery capacity is often considered essential for the primary purpose of moving the vehicle, so the amount of battery capacity that can be dedicated to secondary vehicle electronics systems is limited. Battery systems employed by remote structures must be capable of providing power when the alternative power source is unavailable, but factors such as cost, size, and weight reduce the overall power storage capacity of such systems.

Heating and cooling systems have substantial energy requirements. Vehicles such as trucks or boats typically rely on the availability of the internal combustion engine when heating or cooling is required. When heating or cooling is required when the vehicle is parked or the boat is moored for more than a couple of minutes, the internal combustion engine will be operated in an idle mode solely to provide power to the heating and cooling system. Engine idling is inefficient and creates unnecessary pollution, and anti-idling laws are being enacted to prevent the use of idling engines, especially in congested environments like cities, truck stops, and harbors. For remote structures such as cabins or shipping containers, heating and cooling systems can be a major draw on battery power. Typically, an alternative or inferior heating or cooling source such as a wood burning stove, fans, or the like are used instead of a DC powered heating and cooling system.

The need thus exists for heating and cooling systems that operate using DC power having improved efficiency to optimize the use of battery power.

SUMMARY

As one example, a HVAC system for a vehicle has a condenser, an evaporator, a compressor, a variable accumulator comprising a piston and an actuator, and a control system operatively connected to the actuator. Fluid flows in a circuit from the condenser, to the evaporator, to the compressor, and to the condenser. The variable accumulator is arranged between the evaporator and the compressor. The control system operates the actuator to displace the piston to alter at least one characteristic of the HVAC system.

DETAILED DESCRIPTION

The present invention may be embodied in a number of different example configurations, and several examples of vehicle heating and cooling systems constructed in accordance with, and embodying, the principles of the present invention will be described separately below.

I. Conventional DC Heating And Cooling System

Figure 1:
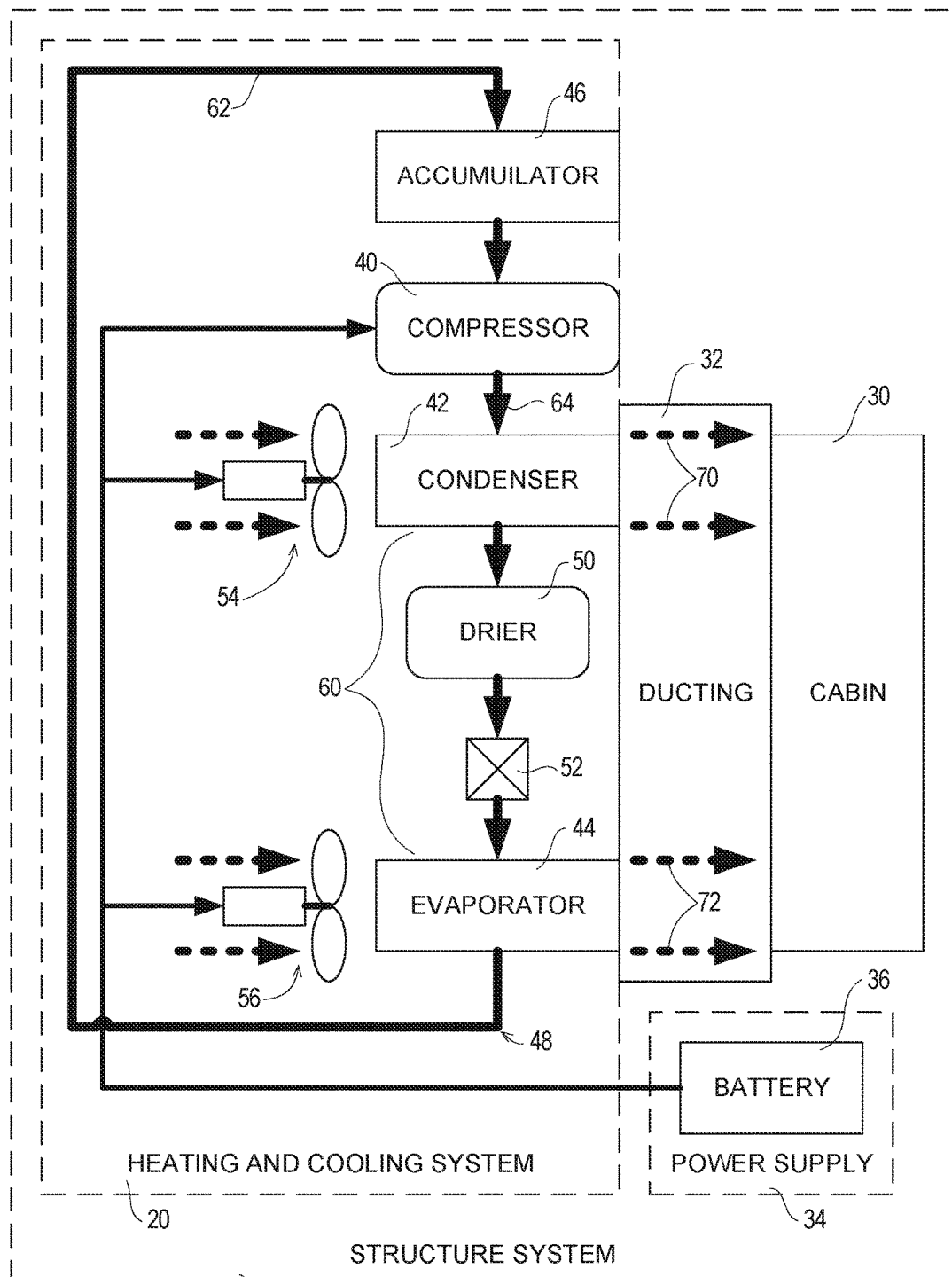
FIG. 1 is a highly schematic view of a conventional heating and cooling system adapted for use in a structure system such as a vehicle or remote structure.

Referring initially to FIG. 1 of the drawing, depicted at 20 therein is an example DC heating and cooling system 20 adapted to operate in conjunction with a structure system 22. The structure system 22 comprises a cabin 30, ducting 32, and a DC power system 34 having one or more batteries 36. The structure system 20 may be, as examples, a vehicle such as a car, truck, or boat or a remote structure such as a cabin or shipping container.

The cabin 30 defines the area of the structure system 22 to be heated and/or cooled. The ducting 32 allows the flow of heated and/or cooled air through the cabin 30. The cabin 30 and the ducting 32 will be defined by the characteristics of the structure system 22, are not per se part of the present invention, and will not be described herein in detail.

The DC power system 34 will take many forms and will be defined by the nature of the structure system 22. For example, if the structure system 22 is a car, truck, or boat, the DC power system 34 will typically include a conventional alternator connected to an internal combustion engine, and the alternator is configured to charge the battery or batteries 36 when the internal combustion engine is operating. If the structure is a remote cabin or possibly a shipping container, the DC power system 34 may include or be connected to a solar power system and/or generator, and the solar power system and/or generator are configured to charge the battery or batteries 36.

In any case, the DC power system 34 will typically be the sole source of power to the structure system 22, and the present invention is of particular significance when utility AC power is not available to the structure system 22. While the principles of the present invention may be used when a utility AC power signal is available to the structure system 22, AC power powered heating and cooling systems may be more effective in the event that utility AC power is available.

FIG. 1 further shows that the example heating and cooling system 20 depicted therein conventionally comprises a compressor 40, a condenser 42, an evaporator 44, and an accumulator 46 connected by a conduit system 48 to define a conventional refrigeration system. In addition, the example heating and cooling system 20 further comprises a drier 50, a metering device 52, a condenser fan 54, and an evaporator blower 56. The conduit system 48 defines a liquid line 60 extending between the condenser 42 and the evaporator 44, a suction line 62 extending between the evaporator 44 and compressor 40, and a discharge line 64 extending between the compressor 40 and the condenser 42. The drier 50 and metering device 52 are arranged in the liquid line 60. The accumulator 46 is arranged in the suction line 62.

When the system operates, the DC power supply 34 is connected to the compressor 40, the condenser fan 54, and the evaporator blower 56. The compressor 40 forces refrigerant through the conduit system 48 in a conventional refrigeration cycle. At the same time, the condenser fan 54 forces air to flow over the condenser 42, resulting in warm air 70 flowing into the ducting 32. The evaporator blower 56 causes air to flow over the evaporator 44, resulting in cold air 72 flowing into the ducting 32. The ducting 32 operates in a conventional manner to allow the warm air 70 or the cold air 72 to flow into the cabin 30 as desired.

Because the example DC heating and cooling system 22 operates based on a DC voltage supplied by the battery 36 of the power supply 34, the size and operating characteristics of the compressor 40 are typically limited and the compressor 40 may not operate effectively over the entire range of operating parameters of the example DC heating and cooling system 22. Because the characteristics of the example DC heating and cooling system 22 are typically fixed, the compressor 40 will not operate with optimum efficiency under at least some of the operating parameters of the example DC heating and cooling system 22.

II. First Example DC Heating and Cooling System

Figure 2:
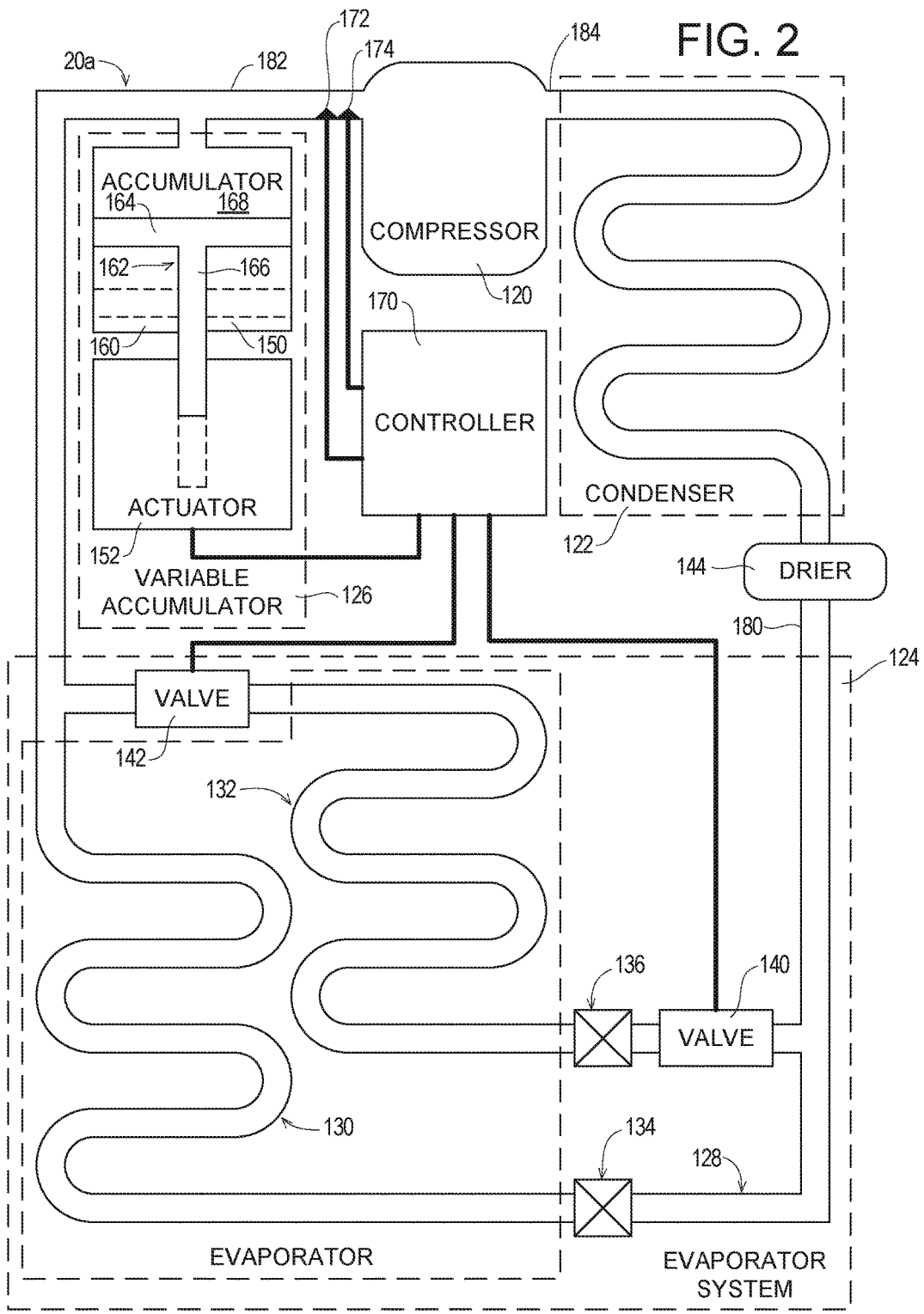
FIG. 2 is a schematic view of a first example of a heating and cooling system of the present invention.

Turning now to FIG. 2 of the drawing, depicted therein is a first example DC heating and cooling system 20a that may be used in place of the DC heating and cooling system 20 with the structure system 22 as depicted in FIG. 1 and described above.

The first example DC heating and cooling system 20a comprises a compressor 120, a condenser 122, an evaporator system 124, and a variable accumulator 126. A conduit system 128 is configured such that refrigerant fluid flows from the compressor 120 to the condenser 122, from the condenser 122 to the evaporator system 124, from the evaporator system 124 to the variable accumulator 126, and back to the compressor 120. The example compressor 220 and condenser 222 are or may be conventional.

FIG. 2 illustrates that the evaporator system 124 comprises a primary coil 130, a secondary coil 132, a primary metering device 134, a secondary metering device 136, a first valve 140, and, optionally, a second valve 142. A drier 144 is arranged upstream of the evaporator system 124. The valves 140 and 142 are operable to allow or prevent refrigerant fluid from flowing from the condenser 122 through the secondary metering device 136 and secondary coil 132. The evaporator system 124 may thus be operated in a first configuration in which the valves 140 and 142 are configured to allow refrigerant fluid to flow only through the primary coil 130 and in a second configuration in which the valves 140 and 142 are configured to allow refrigerant fluid to flow through both the primary coil 130 and the secondary coil 132.

FIG. 2 further illustrates that the example variable accumulator 126 comprises an accumulator assembly 150 and an actuator assembly 152. The accumulator assembly 150 comprises a housing 160 and a piston 162 comprising a head portion 164 and a shaft portion 166. The head portion 164 is arranged within the housing 160 to define a sealed accumulator chamber 168. The shaft portion 166 extends from the housing 160 and engages the actuator assembly 152. The actuator assembly 152 is capable of moving the piston 162 relative to the housing 160 such that a volume of the actuator chamber 168 may be varied between a first volume (solid lines in FIG. 2) and a second volume (broken lines in FIG. 2). The actuator assembly 162 may be a screw actuator, pneumatic or hydraulic actuator, or any other actuator cable of causing linear displacement of the piston 162 as shown by a comparison of the solid and dotted lines in FIG. 2.

The first example DC heating and cooling system 20a further optionally comprises a control system comprising a controller 170 and first and second sensors 172 and 174. The first and second sensors 172 and 174 measure and/or quantify characteristics of the refrigerant fluid, and the example first and second sensors 172 and 174 measure the temperature and pressure, respectively, of the refrigerant fluid. Additional sensors such may be connected to the controller 170 to measure ancillary characteristics of the DC heating and cooling system 20a such as outside temperature and cabin temperature. Further, the controller 170 may optionally be connected to user input devices such as a control panel or thermostat. The example conduit system 128 defines a liquid line 180, a suction line 182, and a discharge line 184. The example sensor 172 and 174 are arranged in the suction line 182 but may be arranged at other locations as appropriate.

The use of the example evaporator system 124 and the example variable accumulator 126 effectively allow the characteristics of the first example DC heating and cooling system 20a to be varied during operation thereof. In the first example DC heating and cooling system 20a, the example controller 170 implements logic that operates the valves 140 and/or 142 and actuator 152 to alter the characteristics of the first example DC heating and cooling system 20a to optimize the performance of the compressor 120 and thus the entire DC heating and cooling system 20a.

III. Second Example DC Heating and Cooling System

Figure 3:
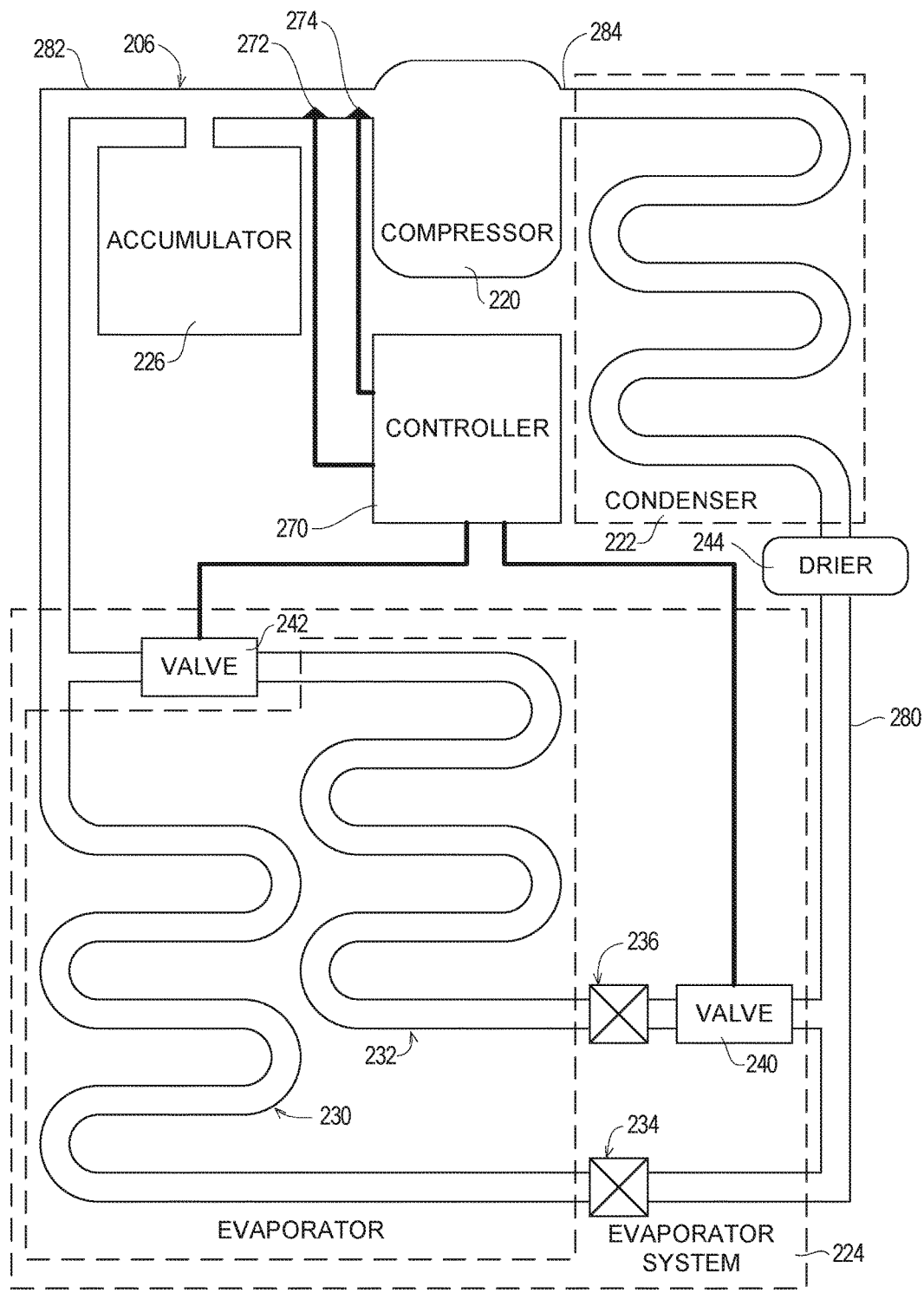
FIG. 3 is a schematic view of a second example of a heating and cooling system of the present invention.

Turning now to FIG. 3 of the drawing, depicted therein is a second example DC heating and cooling system 20b that may be used in place of the DC heating and cooling system 20 with the structure system 22 as depicted in FIG. 2 and described above.

The second example DC heating and cooling system 20a comprises a compressor 220, a condenser 222, an evaporator system 224, and an accumulator 226. A conduit system 228 is configured such that refrigerant fluid flows from the compressor 220 to the condenser 222, from the condenser 222 to the evaporator system 224, from the evaporator system 224 to the variable accumulator 226, and back to the compressor 220. The example compressor 220, condenser 222, and accumulator 226 are or may be conventional.

FIG. 3 illustrates that the evaporator system 224 comprises a primary coil 230, a secondary coil 232, a primary metering device 234, a secondary metering device 236, a first valve 240, and, optionally, a second valve 242. A drier 244 is arranged upstream of the evaporator system 224. The valves 240 and 242 are operable to allow or prevent refrigerant fluid from flowing from the condenser 222 through the secondary metering device 236 and secondary coil 232. The evaporator system 224 may thus be operated in a first configuration in which the valves 240 and 242 are configured to allow refrigerant fluid to flow only through the primary coil 230 and in a second configuration in which the valves 240 and 242 are configured to allow refrigerant fluid to flow through both the primary coil 230 and the secondary coil 232.

The second example DC heating and cooling system 20b further optionally comprises a control system comprising a controller 270 and first and second sensors 272 and 274. The first and second sensors 272 and 274 measure and/or quantify characteristics of the refrigerant fluid, and the example first and second sensors 272 and 274 measure the temperature and pressure, respectively, of the refrigerant fluid. Additional sensors such may be connected to the controller 270 to measure ancillary characteristics of the DC heating and cooling system 20b such as outside temperature and cabin temperature. Further, the controller 270 may optionally be connected to user input devices such as a control panel or thermostat. The example conduit system 228 defines a liquid line 280, a suction line 282, and a discharge line 284. The example sensor 272 and 274 are arranged in the suction line 282 but may be arranged at other locations as appropriate.

The use of the example evaporator system 224 effectively allow the characteristics of the second example DC heating and cooling system 20b to be varied during operation thereof. In the second example DC heating and cooling system 20b, the example controller 270 implements logic that operates the valves 240 and/or 242 to alter the characteristics of the second example DC heating and cooling system 20b to optimize the performance of the compressor 220 and thus the entire DC heating and cooling system 20b.

IV. Third Example DC Heating and Cooling System

Figure 4:
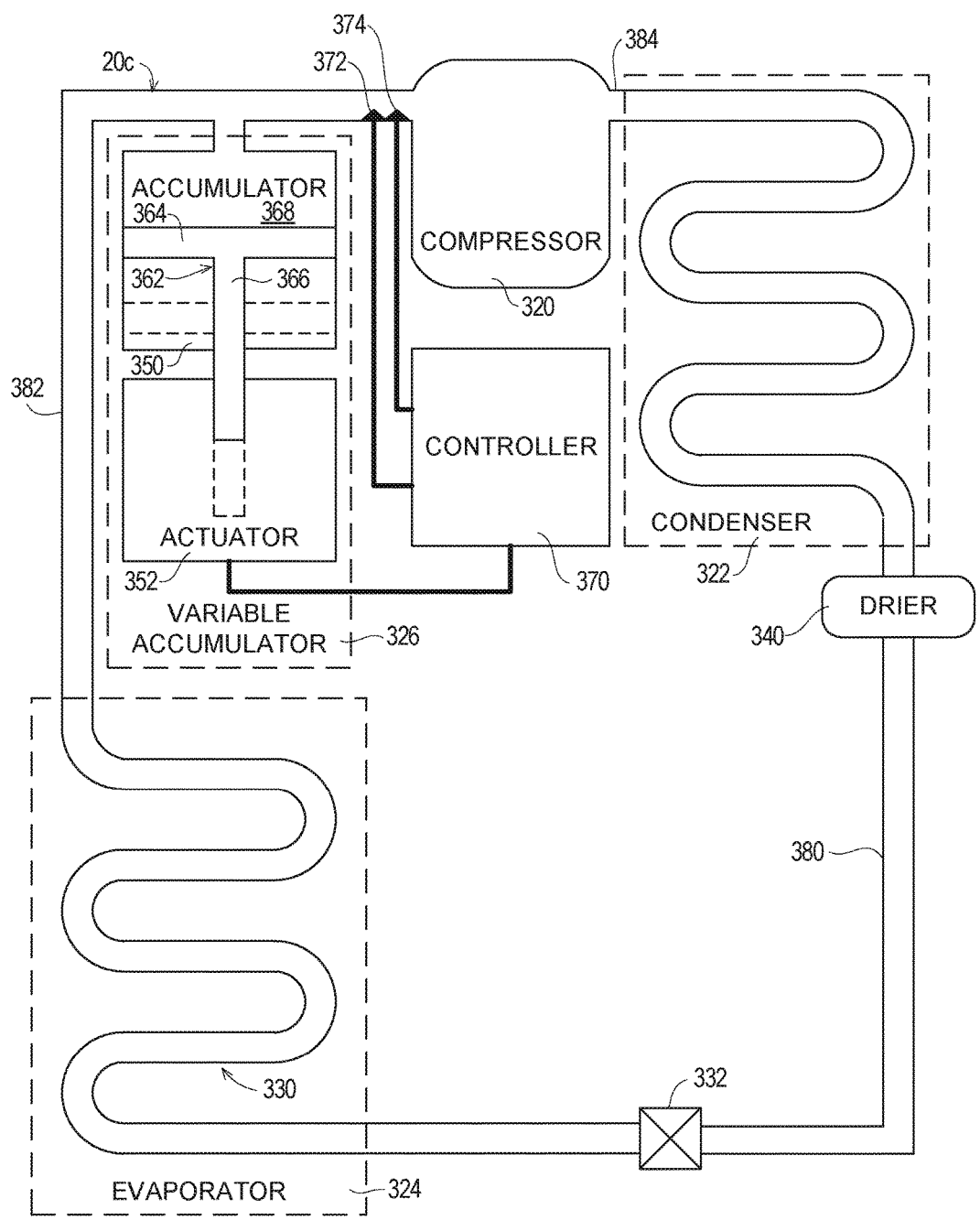
FIG. 4 is a schematic view of a third example of a heating and cooling system of the present invention.

Turning now to FIG. 4 of the drawing, depicted therein is a third example DC heating and cooling system 20c that may be used in place of the DC heating and cooling system 20 with the structure system 22 as depicted in FIG. 4 and described above.

The third example DC heating and cooling system 20c comprises a compressor 320, a condenser 322, an evaporator 324, and a variable accumulator 326. A conduit system 328 is configured such that refrigerant fluid flows from the compressor 320 to the condenser 322, from the condenser 322 to the evaporator system 324, from the evaporator system 324 to the variable accumulator 326, and back to the compressor 320. The example compressor 220, condenser 222 and evaporator 324 are or may be conventional. FIG. 4 illustrates that the evaporator 324 comprises a coil 330 and is connected to a metering device 332 and a drier 340.

FIG. 4 further illustrates that the example variable accumulator 326 comprises an accumulator assembly 350 and an actuator assembly 352. The accumulator assembly 350 comprises a housing 360 and a piston 362 comprising a head portion 364 and a shaft portion 366. The head portion 364 is arranged within the housing 360 to define a sealed accumulator chamber 368. The shaft portion 366 extends from the housing 360 and engages the actuator assembly 352. The actuator assembly 352 is capable of moving the piston 362 relative to the housing 360 such that a volume of the actuator chamber 368 may be varied between a first volume (solid lines in FIG. 4) and a second volume (broken lines in FIG. 4). The actuator assembly 362 may be a screw actuator, pneumatic or hydraulic actuator, or any other actuator cable of causing linear displacement of the piston 362 as shown by a comparison of the solid and dotted lines in FIG. 4.

The third example DC heating and cooling system 20c further optionally comprises a control system comprising a controller 370 and first and second sensors 372 and 374. The first and second sensors 372 and 374 measure and/or quantify characteristics of the refrigerant fluid, and the example first and second sensors 372 and 374 measure the temperature and pressure, respectively, of the refrigerant fluid. Additional sensors such may be connected to the controller 370 to measure ancillary characteristics of the DC heating and cooling system 20c such as outside temperature and cabin temperature. Further, the controller 370 may optionally be connected to user input devices such as a control panel or thermostat. The example conduit system 328 defines a liquid line 380, a suction line 382, and a discharge line 384. The example sensor 372 and 374 are arranged in the suction line 382 but may be arranged at other locations as appropriate.

The use of the evaporator system 324 and variable accumulator effectively allow the characteristics of the third example DC heating and cooling system 20c to be varied during operation thereof. In the third example DC heating and cooling system 20c, the example controller 370 implements logic that operates the valves 340 and/or 342 and actuator 352 to alter the characteristics of the third example DC heating and cooling system 20c to optimize the performance of the compressor 320 and thus the entire DC heating and cooling system 20c.

V. Summary

A multi-mode evaporator system such as the example evaporator systems 124 and 224 and/or the variable accumulator such as the example variable accumulator systems 126 and 326 may be used as part of any heating and cooling system configured to operate using DC power. As examples, the multi-mode evaporator and variable accumulator of the present invention may be used as the evaporator and/or accumulator of the DC heating and cooling systems depicted and described in the Applicant's co-pending U.S. Provisional Patent Application Ser. No. 61/950,719, and the contents of the '719 provisional application are incorporated herein by reference.

What is claimed is:

1. A HVAC system for an area of a vehicle to be heated and cooled comprising:
    a condenser;
    an evaporator system comprising a primary coil and a secondary coil, where the evaporator system is arranged to heat or cool the area of the vehicle to be heated and cooled;
    at least one valve;
    a compressor;
    a battery configured to supply power to the compressor;
    a variable accumulator comprising a housing, a piston arranged within the actuator chamber to define an actuator chamber, and an actuator configured to displace the piston relative to the housing; and
    a control system comprising a controller operatively connected to the actuator and to at least one sensor; wherein
    the variable accumulator is arranged between the evaporator and the compressor;
    a refrigerant fluid flows in a circuit from the condenser, to the evaporator, through the variable accumulator, to the compressor, and back to the condenser;
    the at least one sensor is configured to measure a characteristic of the refrigerant fluid;
    the control system operates based on the characteristic associated with the refrigerant fluid measured by the at least one sensor to cause the at least one valve to allow the evaporator to operate in
        a first configuration in which the refrigerant fluid flows only through the primary coil such that heat transfer from only the primary coil heats or cools the area of the vehicle to be heated and cooled, and
        a second configuration in which the primary coil and the secondary coil are connected to allow the refrigerant fluid flows through both the primary coil and the secondary coil such that heat transfer from both the primary and secondary coils heats or cools the area of the vehicle to be heated and cooled; and
    the actuator to displace the piston to vary a volume of the actuator chamber to optimize use of power supplied from the battery to the compressor when the evaporator operates in the first and second configurations.

2. A HVAC system as recited in claim 1, in which the control system:
    comprises a plurality of sensors, where the plurality of sensors are configured to measure a plurality of characteristics of the refrigerant fluid; and
    operates the at least one valve and the actuator based on the plurality of characteristics of the refrigerant fluid.

3. A HVAC system as recited in claim 1, in which the control system:
    comprises a plurality of sensors, where the plurality of sensors are configured to measure temperature and pressure of the refrigerant fluid; and
    operates the at least one valve and the actuator based on at least one of temperature and pressure of the refrigerant fluid.

4. A HVAC system as recited in claim 1, in which the control system:
    comprises a plurality of sensors, where the plurality of sensors are configured to measure temperature and pressure of the refrigerant fluid; and
    operates the at least one valve and the actuator based on temperature and pressure of the refrigerant fluid.

5. A HVAC system as recited in claim 1, in which the control system operates the at least one valve and the actuator based on at least one of temperature of the refrigerant fluid, pressure of the refrigerant fluid, outside temperature, and cabin temperature.

6. A HVAC system as recited in claim 1, in which the control system further operates the at least one valve and the actuator based on at least one of a control panel and a thermostat.

7. A HVAC system as recited in claim 1, in which the control system further operates the at least one valve and the actuator based on at least one of temperature of the refrigerant fluid, pressure of the refrigerant fluid, outside temperature, cabin temperature, a control panel, and a thermostat.

8. A HVAC system as recited in claim 1, in which:
    the evaporator system comprises first and second valves; and
    the control system further operates the first and second valves based on at least one characteristic of the HVAC system.

* * * * *